United States Patent [19]

Tischer

[11] Patent Number: 5,799,976

[45] Date of Patent: Sep. 1, 1998

[54] SKI MOUNTED GUARD ASSEMBLY FOR SNOWMOBILES

[76] Inventor: Walter D. Tischer, P.O. Box 816, Alexandria, Minn. 56308

[21] Appl. No.: 855,748

[22] Filed: May 8, 1997

Related U.S. Application Data

[63] Continuation of Ser. No. 461,726, Jun. 5, 1995, abandoned.

[51] Int. Cl.[6] .................................................. B62B 9/14
[52] U.S. Cl. .......................... 280/770; 280/850; 180/190; 293/102; 293/13; 293/154
[58] Field of Search .............................. 280/24, 770, 818, 280/850; 180/184, 186, 190; 293/12, 13, 102, 119, 154

[56] References Cited

U.S. PATENT DOCUMENTS

| | | | |
|---|---|---|---|
| 1,864,041 | 6/1932 | Emigh | 180/182 |
| 2,442,918 | 6/1948 | Caughrean | 280/15 |
| 3,171,667 | 3/1965 | Wightman | 280/818 |
| 3,727,937 | 4/1973 | Maki, Jr. | 280/24 |
| 3,785,688 | 1/1974 | Sibley | 293/62 |
| 3,907,320 | 9/1975 | Charneck | 280/818 |
| 4,856,799 | 8/1989 | Hawn | 280/24 |
| 5,109,941 | 5/1992 | Thompson | 180/182 |
| 5,168,601 | 12/1992 | Liu | 280/47.371 X |
| 5,290,055 | 3/1994 | Treat, Jr. | 280/47.371 X |
| 5,441,294 | 8/1995 | Losier | 180/182 X |

Primary Examiner—Robert J. Oberleitner
Assistant Examiner—Pamela J. Lipka
Attorney, Agent, or Firm—Westman, Champlin & Kelly, P.A.; S. Koehler

[57] ABSTRACT

A guard assembly for a snowmobile having two forwardly extending skis includes a first support mountable to a first ski and a second support mountable to a second ski. A slide assembly is mounted to and between the first and second supports. The slide assembly includes a first slide member joined to the first support and a second slide member joined to the second support. The first slide member moves relative to the second slide member during operation of the snowmobile.

14 Claims, 3 Drawing Sheets

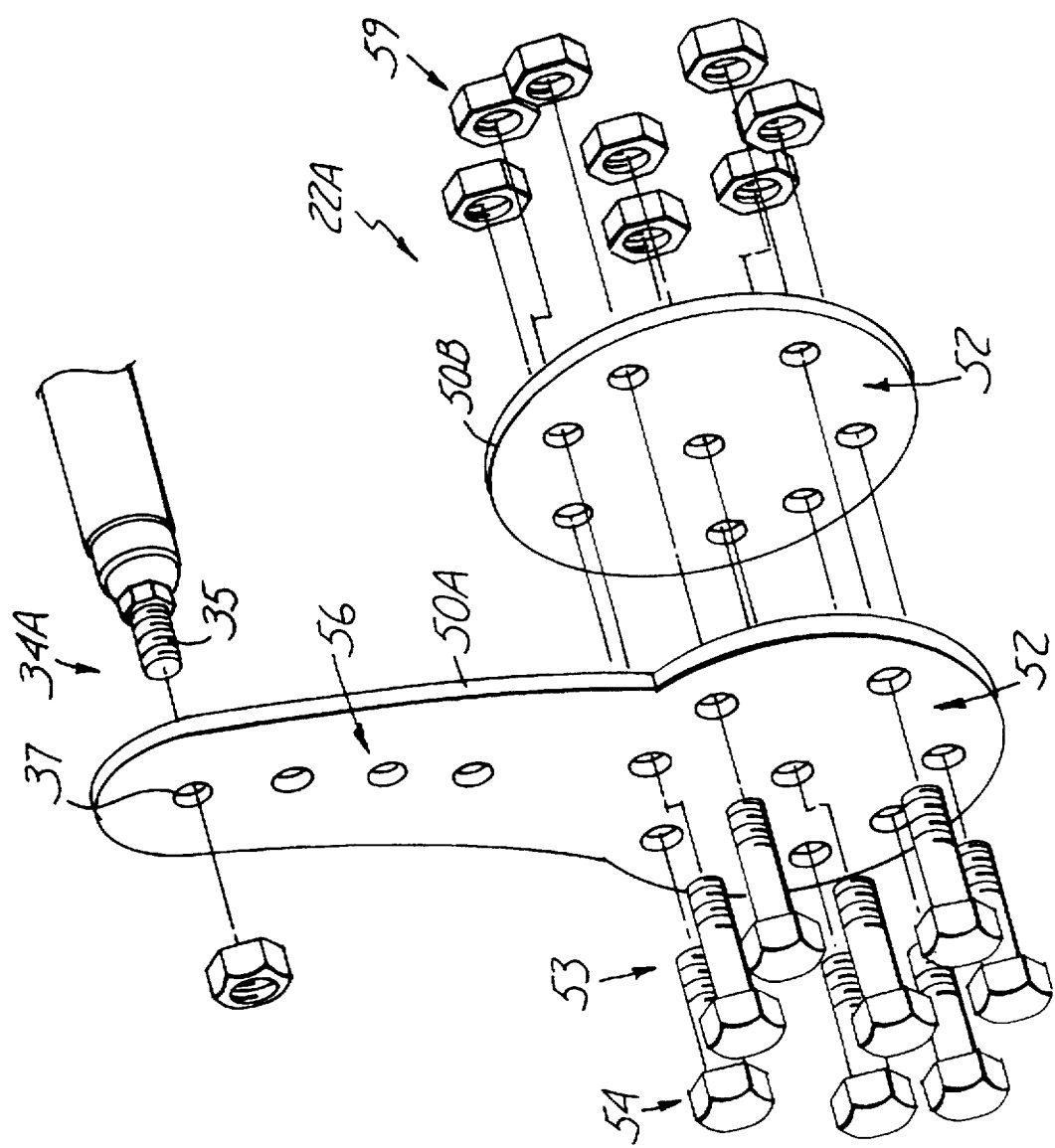

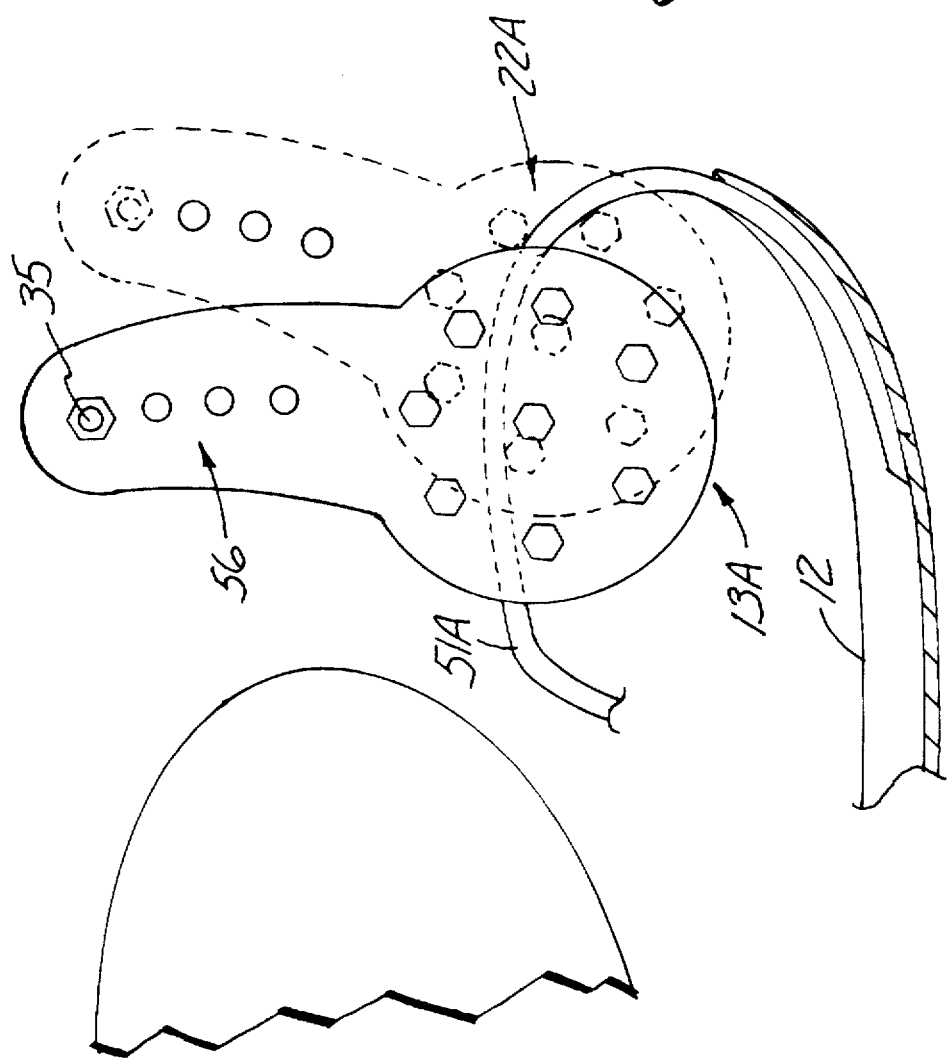

SKI MOUNTED GUARD ASSEMBLY FOR SNOWMOBILES

This is a continuation of application Ser. No. 08/461,726, filed Jun. 5, 1995 now abandoned.

BACKGROUND OF THE INVENTION

The present invention relates to a guard used on a snowmobile to protect a body panel of the snowmobile from damage.

Bumpers are commonly provided on snowmobiles to protect a hood or other front panel of the snowmobile from damage resulting with impacts with other objects. Although bumpers can prevent or reduce the damage sustained by the snowmobile hood, this damage is prevented at the expense of the bumper. During the course of operation, the bumper can accumulate a number of scratches and/or dents which detract from the value of the snowmobile upon resale. Although bumpers can be replaced, protection of all original body panels and components attached thereto is desirable.

SUMMARY OF THE INVENTION

A guard assembly for a snowmobile having two forwardly extending skis includes a first support mountable to a first ski and a second support mountable to a second ski. A slide assembly is mounted to and between the first and second supports. The slide assembly includes a first slide member joined to the first support and a second slide member joined to the second support. The first slide member moves relative to the second slide member during operation of the snowmobile.

In a preferred embodiment, the slide assembly comprises a telescoping tube assembly wherein the first slide member includes a cylindrical aperture and the second slide member is insertable therein. The slide assembly is adjustably positioned to upwardly extending ski tips of the skis. Preferably, each of the supports is a clamping assembly having two clamping plates. The clamping plates are adjustably secured to the ski tips. One clamping plate of each clamping assembly has an extending portion that extends upwardly and has a plurality of vertically spaced apertures that are used to mount the slide assembly and adjust its vertical position with respect to the ground.

BRIEF DESCRIPTION OF THE DRAWINGS

FIG. 2 is an exploded view of a portion of the guard assembly; and

FIG. 3 is a side elevational view of the guard assembly.

DETAILED DESCRIPTION OF THE PREFERRED EMBODIMENTS

Figure 1:
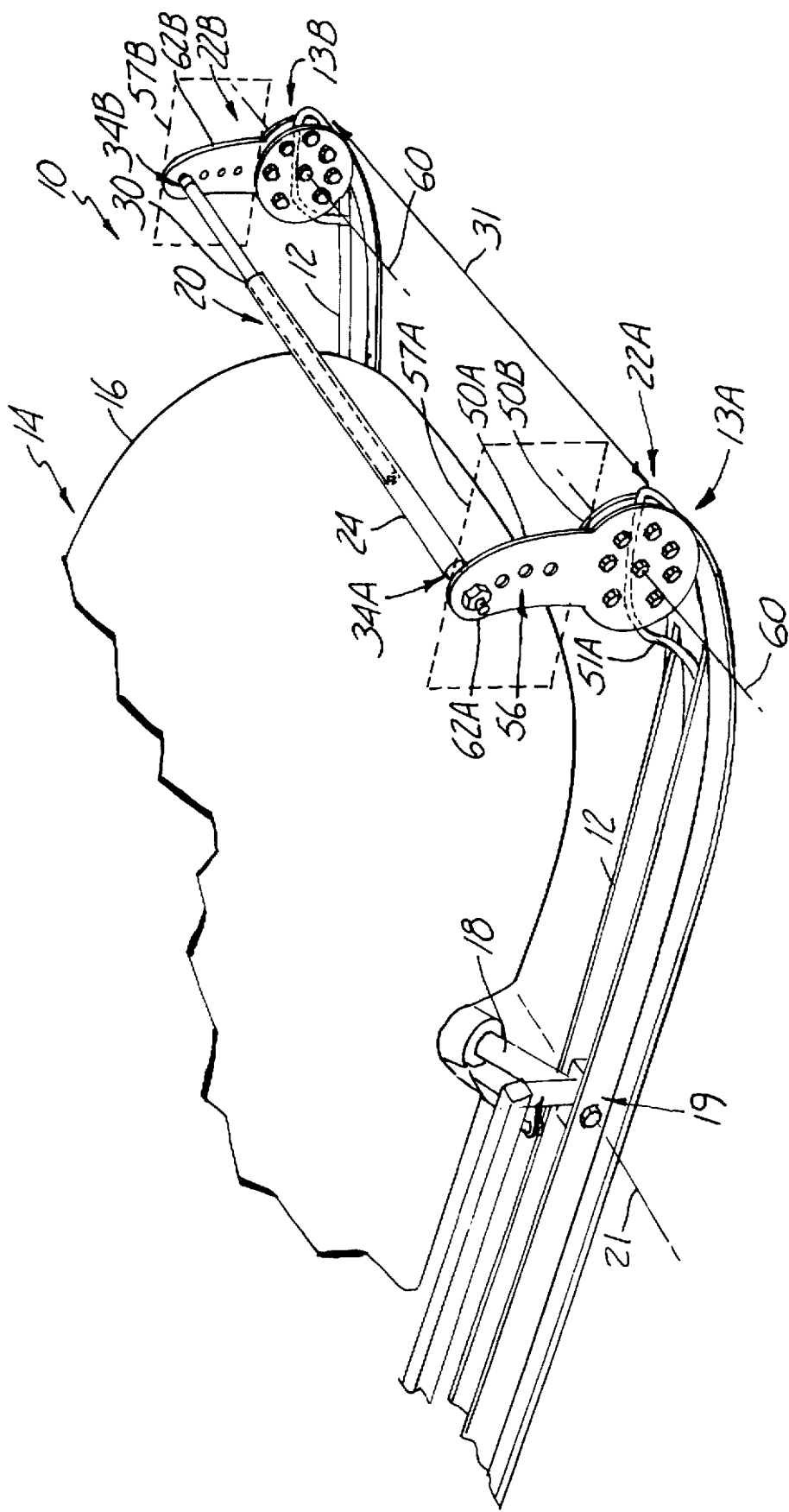
FIG. 1 is a perspective view of a guard assembly of the present invention mounted to skis of a snowmobile.

A representative embodiment of a guard assembly of the present invention is illustrated in FIG. 1 at 10. Generally, the guard assembly 10 mounts to forwardly extending skis 12 of a snowmobile 14, a portion of which is illustrated in FIG. 1. The guard assembly 10 protects front body panels of the snowmobile 14, particularly a forward extending hood 16 from damage. The guard assembly 10 provides an impact barrier for an object that would otherwise strike the front portion of the snowmobile 14 if the snowmobile 14 was traveling forwardly, or if the snowmobile 14 was stationary and the object was moving toward the front portion of the snowmobile 14.

With respect to the snowmobile 14, since these vehicles are readily commercially available, it will not be described in detail herein. Briefly, the snowmobile 14 includes a track mounted under a seat and tail section of the snowmobile 14. A suitable drive device, such as a gasoline powered engine, is connected to the track to propel the snowmobile 14 forwardly. A steering shaft 18 is joined to each of the skis 12 and operate in unison to turn the skis 12 and thus steer the snowmobile 14. Typically, end couplings 19 are provided on the ends of the skis 12 which allow the skis 12 to pivot about an axis 21 perpendicular to the longitudinal axis of the shafts 18. In this manner, the skis 12 can move independently of each other to accommodate terrain variations.

Generally, the guard assembly 10 includes a slide assembly 20 and supports 22A and 22B used to mount the slide assembly 20 to the snowmobile 14, and in particular, to each of the skis 12. The slide assembly 20 includes a first slide member 24 joined to support 22A and a second slide member 26 joined to support 22B. In the embodiment illustrated, the slide assembly 20 is a telescoping tube assembly. The first slide member 24 has an inner cavity that is open at an end 30. The cavity and the opening on end 30 have a sufficient diameter to receive the second slide member 26 therein. As appreciated by those skilled in the art, other assemblies having elements that slide relative to each other can also be used. For instance, two rods or plates having a suitable coupling that allows the rods to slide relative to each other can also be used.

The first slide member 24 and the second slide member 26 move relative to each other in order to accommodate changes in a distance indicated by arrow 31, which varies as the snowmobile 14 is operated. For example, as the snowmobile 14 travels forwardly, one ski 12 may pivot about the axis 21 as it encounters a small bump or depression, while the other ski 12 remains substantially horizontal. Due to pivoting motion of the ski 12, the distance 31 increases. The first slide member 24 and the second slide member 26 slide relative to each other to accommodate changes in the distance 31, while remaining substantially in front of the body panel to be protected.

In a preferred embodiment, the first slide member 24 and the second slide member 26 are each joined to their corresponding supports 22A and 22B with suitable pivot connections indicated at 34A and 34B, respectively. Referring to FIG. 2, the pivot connection 34A comprises a suitable ball joint which allow pivoting motion of the first slide member 24 with respect to the support 22A. The pivot connection 34A includes a threaded shaft 35 which extends through an aperture 37 of the support 22A and is held in place with a suitable nut 39. The pivot connection 34B comprises a similar ball joint that is joined to the support 34B. As stated above, the snowmobile 14 is typically driven over uneven terrain which causes the skis 12 to pivot about the horizontal axis 21 extending through each support shaft 18. Pivoting motioning of the skis 12 in turn allows ski tips 13A and 13B to be displaced away from each other a distance larger than if the ski tips 13A and 13B were parallel. Sliding motion of the first slide member 24 with respect to the second slide member 26 accommodates this change in distance, while the pivot connections 34A and 34B allow the slide assembly 20 to extend between the supports 22A and 22B at the required angle. Although illustrated with ball joints, it should be understood that other suitable pivot connections such as rubber bushings or other similar devices can be used to allow pivoting motion of the slide assembly 20 with respect to the supports 22A and 22B.

In the embodiment illustrated, each of the supports 22A and 22B is a clamping assembly. Referring to FIG. 2 and to the support 22A by way of example, the support 22A includes two clamping plates 50A and 50B which are secured together with a suitable fastening device 53. The clamping plates 50A and 50B are located on opposite sides of a tow brace 51A (FIG. 1) located at the ski tip 13A, and commonly provided on most snowmobile skis. Each of the clamping plates 50A and 50B includes a plurality of apertures 52 through which corresponding fastening bolts 54 extend to hold the clamping plates 50A and 50B in place with nuts 59.

The clamping plate 50A includes a second plurality of laterally spaced apertures 56 one of which is the aperture 37. The plurality of apertures 56 are used to adjust the slide assembly 20 vertically with respect to the ground so that it can be properly positioned to protect the hood 16 or other front body panels.

In some circumstances, it may be desirable to also adjust the position of the slide assembly 20 from the hood 16 or other front body panel. In the embodiment illustrated, the apertures 52 and corresponding fasteners 54 used to secure the clamping plates 50A and 50B together are suitably spaced-apart to allow the clamping plates 50A and 50B to be rotated about an axis 60 and/or linearly (horizontal/vertical) displaced as illustrated in FIG. 3. This flexibility allows the slide assembly 20 to be moved closer to or farther from the hood 16 as necessary. Adjustably securing the clamping plates 50A and 50B to the ski 12 combined with the plurality of apertures 56 allows the pivot connection 34A to be positioned as needed in a plane 57A generally perpendicular to the ground. Similarly, the pivot connection 34B can be adjusted in a plane 57B that is generally perpendicular to the ground. Of course, if desired, additional apertures can be provided in extending portions 62A and 62B of the supports 22A and 22B, respectively, to allow the slide assembly 20 to be located in desired horizontal as well as vertical positions.

In summary, the guard assembly 10 is well suited to protect the forward portions of the snowmobile 14. Although there are many different manufacturers of snowmobiles having parallel skis 12 of different widths, the first slide member 24 and the second slide member 26 can slide relative to each other to accommodate the desired width. In addition, the slide assembly 20 can be adjusted vertically and horizontally as needed to protect the desired front body panel.

Although the present invention has been described with reference to preferred embodiments, workers skilled in the art will recognize that changes may be made in form and detail without departing from the spirit and scope of the invention.

What is claimed is:

1. A guard assembly for a snowmobile having two forwardly extending skis, the guard assembly comprising:

a first support mountable to a first ski;

a second support mountable to a second ski;

a slide assembly having two slide members joined for slidable movement relative to each other during operation of the snowmobile, wherein a first slide member is joined to the first support and a second slide member is joined to the second support;

a first ball joint joining an end of the first slide member to the first support; and second ball joint joining an end of the second slide member to the second support.

2. The guard assembly as recited in claim 1 wherein the first slide member includes an aperture along a longitudinal axis, and wherein the second slide member is moveable in and out of the aperture.

3. The guard assembly as recited in claim 2 wherein the first slide member and the second slide member are cylindrical.

4. The guard assembly as recited in claim 1 wherein the first ball joint is adjustably positionable on the first support and the second ball joint is adjustably positionable on the second support.

5. The guard assembly as recited in claim 4 wherein the first support includes a first plurality of spaced-apart apertures for mounting the first ball joint, and the second support includes a second plurality of spaced-apart apertures for mounting the second ball joint.

6. The guard assembly as recited in claim 5 wherein the first support comprises a first clamping assembly, and wherein the second support comprises a second clamping assembly.

7. The guard assembly as recited in claim 6 wherein the first clamping assembly comprises a first pair of plates and a first fastener joining the first pair of plates together; and wherein the second clamping assembly comprises a second pair of plates and a second fastener joining the second pair of plates together.

8. The guard assembly as recited in claim 7 wherein a plate of the first pair of plates includes the first plurality of spaced-apart apertures; and wherein a plate of the second pair of plates includes the second plurality of spaced-apart apertures.

9. In combination with a snowmobile having skis with ski tips that vary in distance between each other during operation of the snowmobile, a guard assembly comprising:

a first support mountable to a first ski;

a second support mountable to a second ski;

a telescoping assembly having a first slide member joined to and being slidable into a second slide member during operation of the snowmobile;

a first ball joint joining an end of the first slide member to the first support; and a second ball joint joining an end of the second slide member to the second support.

10. The combination as recited in claim 9 wherein the first ball joint is adjustably positionable on the first support and the second ball joint is adjustably positionable on the second support.

11. The combination as recited in of claim 10 wherein the first support includes a first plurality of spaced-apart apertures for mounting the first ball joint, and the second support includes a second plurality of spaced-apart apertures for mounting the second ball joint.

12. The combination as recited in claim 9 wherein the first support comprises a first clamping assembly adjustably secured to the first ski, and wherein the second support comprises a second clamping assembly adjustably secured to the second ski.

13. The combination as recited in claim 12 wherein the first clamping assembly comprises a first pair of plates mountable to a ski tip and a first fastener joining the first pair of plates together; and wherein the second clamping assembly comprises a second pair of plates mountable to a ski tip and a second fastener joining the second pair of plates together.

14. The combination as recited in claim 13 wherein a plate of the first pair of plates includes a first plurality of spaced-apart apertures for adjusting a position of the first ball joint on the first support, and wherein a plate of the second pair of plates includes a second plurality of spaced-apart apertures for adjusting a position of the second ball joint on the second support.

* * * * *